BEST AVAILABLE COPY
JAMES DUFF.
Improvement in Self-Lubricating Journal-Box.
RE 4,502.
Reissued August 8, 1871.
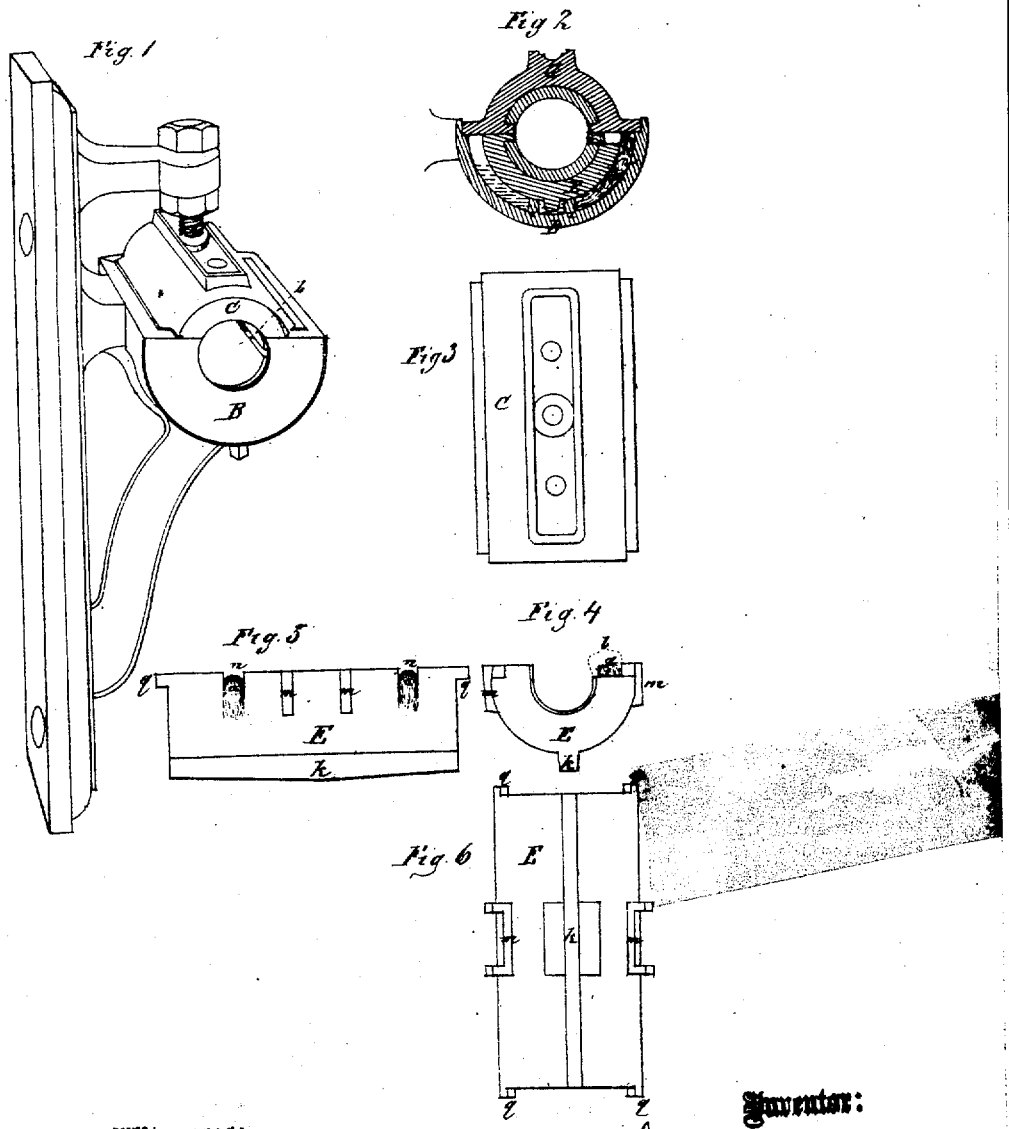
Witnesses:
Solon C. Kemon
A. W. Hart
Inventor:
James Duff
per Munn & Co
Attorneys.

UNITED STATES PATENT OFFICE.

JAMES DUFF, OF PEORIA, ILLINOIS, ASSIGNOR TO HIMSELF AND E. B. PIERCE, OF SAME PLACE.

IMPROVEMENT IN SELF-LUBRICATING JOURNAL-BOXES.

Specification forming part of Letters Patent No. 90,937, dated June 8, 1869; reissue No. 4,502, dated August 8, 1871.

*To all whom it may concern:*

Be it known that I, JAMES DUFF, of Peoria, in the county of Peoria and State of Illinois, have invented a new and Improved Self-Lubricating Journal-Box; and I do hereby declare the following to be a full, clear, and exact description of the same, reference being had to the accompanying drawing making a part of this specification, in which—

Figure 1 is a plan of my invention with the cap removed. Fig. 2 is a transverse vertical section with the cap in place, and Fig. 3 is a side elevation of the journal-box.

This invention relates to a journal-box placed within an oil-box, and provided with a wick occupying a longitudinal groove in the side of the journal-box, at the top of the same, and passing at one or more points through orifices in the journal-box into the oil-box, so as to take oil from the latter by capillary attraction and deliver it at the side of the shaft in the journal-box, from which it runs back into the oil-box through spaces left between the ends of the latter and of the journal-box, and also through spaces at the sides.

Referring to the drawing, B is the oil-box, made of any convenient form and size. Said oil-box is provided with central bearings *i*, upon which the journal-box E rests. The journal-box is made shorter than the oil-box, as shown in Fig. 1, fitting between the end pieces of the latter, and provided with projections *g*, of equal length at its corners, which projections abut against the insides of the end pieces of the oil-box. The journal-box is also provided with external transverse ribs *m* at its sides, which abut against the inside of the oil-box. The journal-box is further provided with an external longitudinal rib, *k*, at its bottom, which passes between the central bearings *i*, and thus prevents the journal-box revolving with the shaft. In the inner side of the journal-box, and at its top, is formed a channel, *b*, extending the whole length of the box, from which channel orifices *n* lead into the oil-box. The wick *a* occupies these orifices and that part of the channel *b* lying between them, and extends as far as may be necessary into the oil-box. The cap C is provided with lips *c* at its edges which shut down past the sides of the oil-box. The wick *a*, by capillary attraction, takes up oil from the box B and delivers it to the side of the shaft through the groove *b*. The surplus escapes from the journal-box through the open spaces *g g'* at the sides and ends of the latter. No oil can waste out of the box E, as these spaces catch it all. As capillary attraction is the sole force that supplies oil to the journal-box, the lubricant comes to the shaft without any of the impurities which are found in all lubricating oils, as such impurities sink to the bottom of the box B and cannot be drawn through the tubes of the wick *a*. Hence a poorer quality of oil can be used with this apparatus than with any in which the oil comes directly in contact with the shaft. Furthermore, the wick, being at the side of the journal-box, may be changed by simply removing the cap.

Having thus described my invention, what I claim as new, and desire to secure by Letters Patent, is—

1. A journal-box, combined with an oil-box and a wick, so that the latter lies in a groove at the side of the journal-box, substantially as described.

2. The journal-box E, provided with the channel *b*, orifices *n*, projections *q*, ribs *m* and *k*, and combined with the oil-box B and wick *a*, as specified.

JAS. DUFF.

Witnesses:
SOLON C. KEMON,
THOS. D. D. OURAND.